United States Patent
Huth et al.

(10) Patent No.: US 8,166,338 B2
(45) Date of Patent: Apr. 24, 2012

(54) RELIABLE EXCEPTION HANDLING IN A COMPUTER SYSTEM

(75) Inventors: Thomas Huth, Boeblingen (DE); Jan Kunigk, Boeblingen (DE); Joerg-Stephan Vogt, Boeblingen (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/786,981

(22) Filed: May 25, 2010

(65) Prior Publication Data

US 2010/0313061 A1 Dec. 9, 2010

(51) Int. Cl.
*G06F 11/00* (2006.01)
(52) U.S. Cl. ...................................................... 714/5.11
(58) Field of Classification Search ............... 714/5, 5.1, 714/5.11
See application file for complete search history.

(56) References Cited

U.S. PATENT DOCUMENTS

| 5,305,455 | A | * | 4/1994 | Anschuetz et al. | 718/100 |
| 5,987,600 | A | * | 11/1999 | Papworth et al. | 712/244 |
| 7,321,990 | B2 | | 1/2008 | Zimmer et al. | |
| 2003/0120968 | A1 | * | 6/2003 | Andress et al. | 714/25 |

* cited by examiner

*Primary Examiner* — Amine Riad
(74) *Attorney, Agent, or Firm* — Yudell Isidore Ng Russell PLLC

(57) ABSTRACT

A method provides exception handling for a computer system. As an error in the computer system's hardware is detected, an exception vector pertaining to the hardware error is determined, and execution flow is transferred to a dispatcher that corresponds/pertains to the exception vector. A specific instance of a plurality of instances of a main exception handler is selected, and the specific instance of the main exception handler is executed. The actual exception handler thus contains two distinct parts, a dispatcher, which is unique and preferably resides in a safe memory region, and a main exception handler, multiple copies of which reside in an unsafe memory region.

20 Claims, 8 Drawing Sheets

US 8,166,338 B2

RELIABLE EXCEPTION HANDLING IN A COMPUTER SYSTEM

PRIORITY CLAIM

The present application claims benefit of priority under 35 USC §120, §365 to the previously filed German Patent Application No. 09161937.9 entitled, "Method and System for Reliable Exception Handling in a Computer System" with a priority date of Jun. 4, 2009, which is incorporated by reference herein.

FIELD OF THE INVENTION

The invention relates generally to computer systems, and, more specifically, to methods for handling exceptions occurring in a computer system during runtime.

BACKGROUND OF THE INVENTION

A typical computer system encompasses main memory hardware in which programs and data are saved. During runtime of the computer system, a module (such as a chip or a dual inline memory module, DIMM) within main memory may become defective. Since this memory module forms part of the system's overall memory address space, such a memory module failure will most likely imply a data loss of the system. Various methods and algorithms of detecting and possibly repairing data loss due to hardware failure are known, such as ECC (Error Correcting Code) and CRC (Cyclic Redundancy Check).

Once a hardware failure in one of the memory modules is detected, a high level system exception (interrupt) is issued indicating the need for attention. Such a hardware interrupt causes the computer system's processor to delegate process control to an exception handler. Exception handlers may have various functions which vary depending on the reason the interrupt was generated. The exception handler is accessed via an exception vector which is specific to the error encountered. Depending on the computer system's basic architecture, this exception vector corresponds either to the memory address of the exception handler or else to an index of an array called the exception vector table, which contains the memory addresses of exception handlers.

The exception handler corresponds to a piece of code which is installed and stored in memory during the computer system startup procedure. This (standard) mechanism for exception handling jeopardizes the reliability of the system, for the following reasons:

For one thing, the exception handler code that is to be used for handling a given memory failure is stored in a region of memory which itself is subject to errors. If the exception handler resides in an address range of the memory module which exhibited the error, and if this memory module error is uncorrectable, the corresponding exception cannot be handled. In a case like this, the computer system will detect a condition that cannot be resolved and which prevents normal operation. As a consequence, the computer system will typically shut down all processor clocks immediately, stop executing instructions, stop responding to interrupts, etc. This (clearly undesirable) state is commonly referred to as a checkstop.

In principle, this problem could be solved by storing the exception handler in a memory region which is regarded to be more reliable (such as on-chip SRAM (static random access memory), Flash ROM (read only memory) or cache). However, such memory is very expensive, and thus areas of safe memory can only be very limited in space. For exception handling in a computer, the memory area typically reserved for handling of a given exception type accommodates small pieces of code and is immediately neighbored by an area corresponding to a different exception type. On the other hand, exception handlers should involve a set of routines that provide for a graceful termination of the computer system (such as collecting checkpoint information, securing the most vital system data, collecting debug and analysis data etc.). This requires a larger storage space which is usually only available in general (unsafe) memory. Thus, the code stored in the safe memory area pertaining to a given exception type is generally no more than a branch to another (unsafe) region in memory in which the exception handler is stored. This brings about the risks described above.

Thus, there is a need of making exception handling more reliable. U.S. Pat. No. 7,321,990 B2 describes a method of improving system reliability by self-migrating system software from a faulty memory location at a failure time. However, the migration handler itself may reside in a faulty memory location in which case self-migration will fail for the reasons explained above. Moreover, the failing memory module may already be too corrupt to be able to provide a copy for migration. Also, the method described in U.S. Pat. No. 7,321,990 B2 relies heavily on the concept of the x86 SMRAM and can thus only be applied to a limited range of computer architectures.

SUMMARY OF THE INVENTION

It is an object of the invention to provide a generally applicable method for handling exceptions caused by hardware errors in a computer system. The exception handling scheme should be reliable in the sense that it provides handling even of catastrophic errors. This handling may include graceful termination of the computing system (such as securing vital system data, collecting debug and analysis data etc.) or even a degraded continuation rather than shutting down system operation ungracefully by disabling the processor clocks (also referred to as a checkstop).

These objectives are achieved by the features of the independent claims. The other claims and the specification disclose advantageous embodiments of the invention.

According to a first aspect of the invention, a method of handling an exception caused by a hardware error in a computer system is provided. The method comprises the steps of (1) determining an exception vector pertaining to said memory error, (2) transferring execution flow control to a dispatcher pertaining to said exception vector, (3) selecting a specific instance of a multitude (or plurality) of instances of a main exception handler and (4) executing the selected instance of the main exception handler. This embodiment of the invention thus splits the actual exception handler into two distinct parts, a dispatcher (which is unique and preferably resides in a safe memory region) and a main exception handler, multiple copies of which reside in an unsafe memory region.

According to a second aspect of the invention, a method of initializing a computer system is provided. The computer system supports an exception handling scheme in which at least one exception vector is associated with a unique exception dispatcher and multiple instances of a main exception handler. The method comprises the steps of (1) allocating memory space for the exception dispatcher and the multiple instances of the main exception handler during firmware execution, and (2) installing the exception dispatcher and the multiple instances of the main exception handler into memory during operating system startup.

According to a third aspect of the invention, a computer system containing computer code for exception handling is provided. When detecting an error in a hardware component of the computer system, the computer system performs the steps of (1) determining an exception vector pertaining to said error, (2) delegating process control to a dispatcher located at the exception vector, (3) selecting a specific instance of multiple instances of a main exception handler and (4) executing the selected instance of the main exception handler.

BRIEF DESCRIPTION OF THE DRAWINGS

The present invention together with the above-mentioned and other objects and advantages may best be understood from the following detailed description of the embodiments, but not restricted to the embodiments, when read in conjunction with the following figures, in which:

FIG. 2b is a detailed schematic view of the memory and the processor of the computer system of FIG. 1, implementing the standard (prior art) exception handling method of FIG. 2a;

FIG. 3b is a detailed schematic view of the memory and the processor of the computer system of FIG. 1, implementing a first embodiment of the exception handling method of FIG. 3a;

FIG. 3c is a detailed schematic view of the memory and the processor of the computer system of FIG. 1, implementing a further embodiment of the exception handling method of FIG. 3a;

Figure 1:
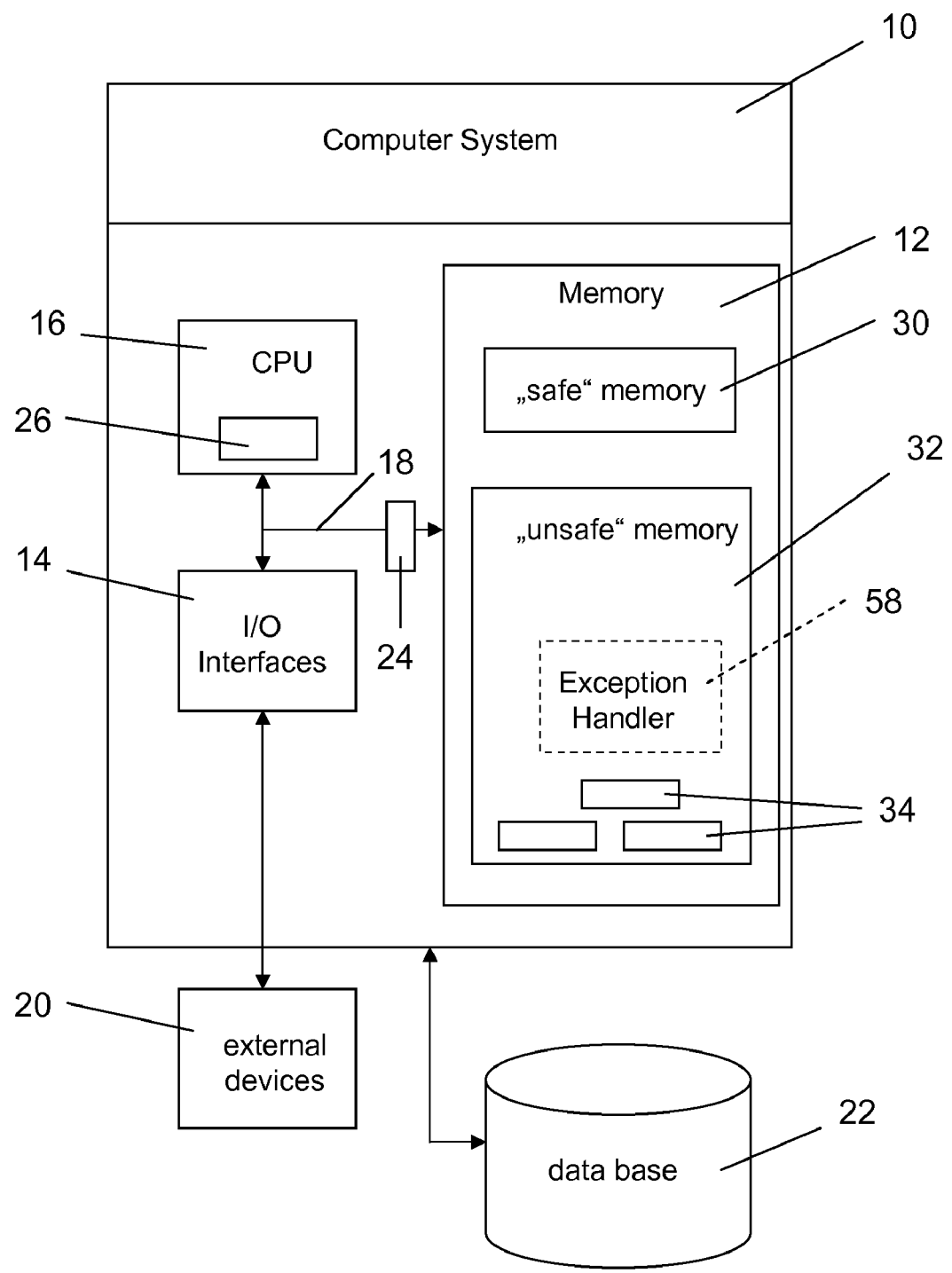
FIG. 1 is a schematic view of a computer system with an exception handler stored in the computer system's memory.

In the drawings, like elements are referred to with equal reference numerals. The drawings are merely schematic representations, not intended to portray specific parameters of the invention. Moreover, the drawings are intended to depict only typical embodiments of the invention and therefore should not be considered as limiting the scope of the invention.

DETAILED DESCRIPTION OF EXAMPLE EMBODIMENTS

FIG. 1 shows a schematic view of a computer system 10 which generally comprises memory 12, input/output (I/O) interfaces 14, a central processing unit (CPU) 16, a data bus 18 as well as external devices/resources 20. Memory controller 24 manages the flow of data going to and from memory 12. CPU 16 may comprise a single processing unit, or else be distributed across one or more processing units in one or more locations, e.g. on a client and server. I/O interfaces 14 may comprise any system for exchanging information from an external source. External devices 20 may comprise any known type of external device, including keyboard, mouse, voice recognition system, printer, monitor, facsimile etc. Data bus 18 provides one or several communication links between each of the components in the computer system 10 and likewise may comprise any known type of transmission link, including electrical, optical, wireless, etc. Computer system 10 may also comprise storage devices 22 for storing additional data and information. Storage devices 22 may include a magnetic disk drive and/or an optical disk drive. Storage devices 22 may also include data distributed across, for example, a local area network (LAN), wide are network (WAN) or a storage area network (SAN). Generally, storage device 22 may be configured in such a way that one of ordinary skill in the art may interpret storage device 22 to include multiple storage devices. Moreover, storage devices 22 could also exist within computer system 10. In addition, although not shown in FIG. 1, additional components such as communication systems, system software, etc. may be incorporated into computer system 10.

Memory hardware 12 contains a safe memory region 30, such as SRAM (static random access memory) or data cache. The term "safe" is used to indicate that memory region 30 uses highly reliable hardware to store data, so that—under normal operating conditions—hardware errors are extreme unlikely to occur. Memory hardware 12 also contains an unsafe (main) memory region 32. The term "unsafe" is used to indicate that hardware errors are expected to occur in this memory region. Unsafe memory 32 may be represented by random access memory (RAM), which is generally organized in memory modules 34 such as DIMMs (dual in-line memory modules), each typically comprising a series of dynamic random access memory integrated circuits (DRAMs). Unsafe memory 32 may also comprise any known type of data storage and/or transmission media, including magnetic media, optical media, read-only memory (ROM), a data object, etc. Moreover, memory 12 may reside at a single physical location, comprising one or more types of data storage, or can be distributed across a plurality of physical systems in various forms.

During normal operation of a computer system 10, memory errors and failures may occur. In the context of this description, the term "memory error" will be used as a general term to describe both correctable and uncorrectable memory abnormalities, whereas the term "memory failure" will be used to describe uncorrectable memory abnormalities. For example, if a one-bit-error occurs in a specific location in memory 32, this kind of error may be detected and repaired by an error correcting code (ECC). On the other hand, if a memory module 34 (e.g. a DIMM) fails altogether, this kind of error cannot be corrected, but requires an exception handling scheme ensuring that this memory module will not be used for data storage in the future.

In order to be able to spot and treat memory errors, the memory subsystem 12 of the computer system 10 supports error detecting/handling code such as parity, error correction code (ECC) or similar mechanisms. Once a memory error has occurred, it may be detected by the memory controller 24 during a memory read such as an instruction, during a data fetch issued by the computer system's CPU 16 or during a memory scrub cycle. As a memory error is detected, an interrupt is launched, i.e. an asynchronous signal is issued from the memory controller 24 to interrupt controller 26, indicating the need for attention. As the interrupt signal is received by an interrupt controller 26 within the computer system's CPU 16, this will generally cause the CPU 16 to interrupt normal execution, save its actual execution state and continue execution at a so-called exception vector that corresponds to the specific exception type of the error encountered (provided, of course, that the corresponding exception type is enabled).

Figure 2A:
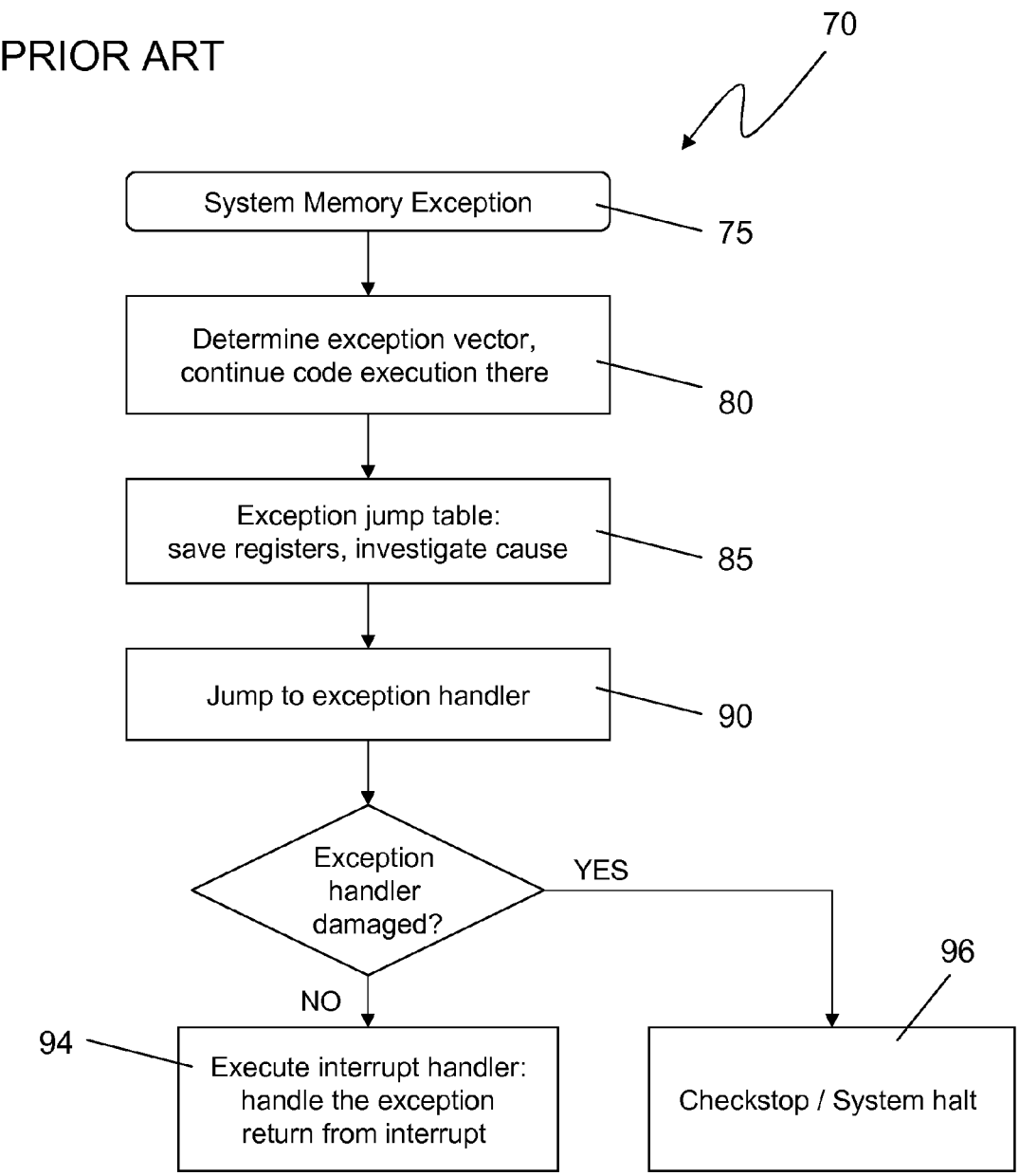
FIG. 2a is a flow diagram of a standard (prior art) exception handling method.
Figure 2B:
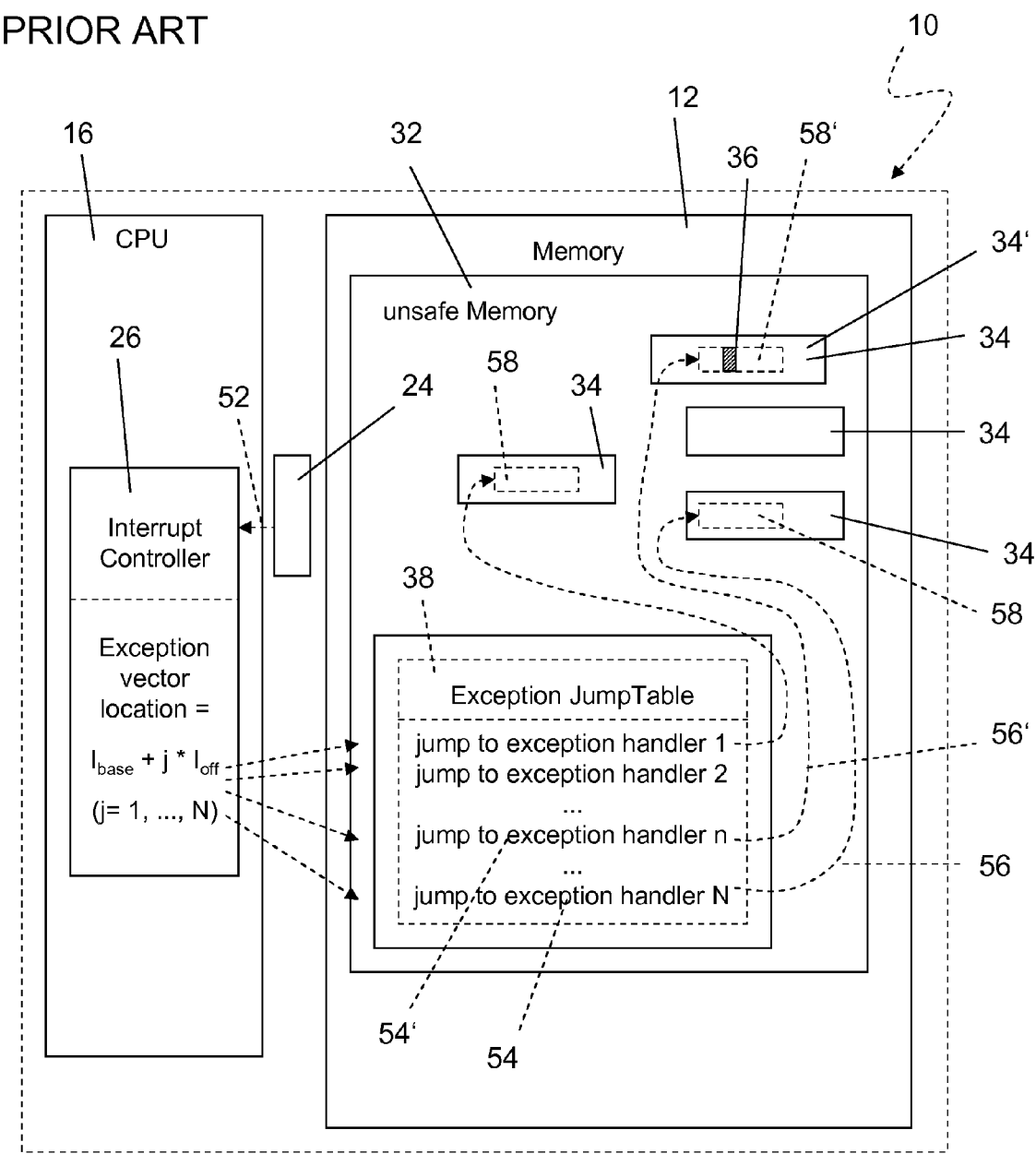

An embodiment of a standard (prior art) exception processing scheme implemented in the computer system 10 will be explained in conjunction with FIGS. 2a and 2b. FIG. 2b schematically depicts a detail of computer system 10 of FIG. 1 with memory hardware 12 and CPU 16. Memory hardware 12 is seen to contain unsafe memory region 32 with memory modules 34. In what follows, primed reference signs (such as 34', 58', ...) will denote a specific memory module, exception handler, etc., whereas un-primed reference signs (such as 34, 58, ...) will denote generic memory modules, exception handlers etc. FIG. 2a shows a schematic flow diagram of a standard (prior art) method 70 for exception handling.

Prior art exception handling method 70 is triggered by the occurrence of a memory error occurring within computer system 10 (step 75 of method 70). For instance, assume that a specific memory module 34' within unsafe memory region 32 experiences a memory error of exception type n, the error occurring at a memory address 36. As this memory error is detected, an interrupt signal (symbolized by an arrow 52 in FIG. 2b) is issued by memory controller 24 of memory region 32 to interrupt controller 26 residing within the CPU 16. Exception processing typically begins by saving a small part of the actual state of the computer system's CPU 16 in certain registers, identifying the cause of the interrupt in another register, and then continuing execution at an exception vector location corresponding to the specific exception (step 80). This is implemented in the interrupt controller 26 of the CPU 16 by calculating an exception vector 54 location as a function of an interrupt base Ibase and a fixed offset Ioff in such a way that the exception vector is determined by adding an integer multiple j of the offset Ioff to the base Ibase, the integer j being determined by the individual exception type. The exception vector corresponds to an entry 54 in an exception jump table 38 which may also contain small pieces of code, e.g. for executing a first investigation of the cause of the interrupt and/or for performing vital interrupt enabling/disabling (step 85). The exception handler address 56, 56' stored at this entry 54, 54' of exception jump table 38 points to the actual exception handler 58, 58' for the specific exception type so that process control is transferred to this exception handler (step 90). Thus, if all goes well, exception handler 58, 58' implements all necessary actions and then returns to the particular instruction where code execution was interrupted by the interrupt event (step 94).

Note, however, that in the schematic view of FIG. 2b the exception handlers 58, 58' reside in the memory region 32 which is unsafe in the sense that it is subject to memory errors of the kind described above. Thus, if a hardware error occurs in a memory location containing the exception handler of this specific error type, the exception cannot be resolved and the computer system may encounter a fatal error (also called a checkstop error) (step 90). In the example of FIG. 2b, the hardware error occurring at address 36 in a memory module 34' is of type n. Thus, the interrupt controller 26 selects the corresponding entry 54' of the exception jump table 38, and the respective exception vector 56' points to exception handler 58' responsible for handling errors of exception type n. However, exception handler 58' happens to reside in a defective region of memory module 34' which is inflicted by the hardware error at memory address 36. If this hardware error is not correctable, then exception handler 58' cannot be executed, and computer system 10 will terminate execution ("crash") without being able to carry out any failure analysis or recovery (step 96).

Figure 3A:
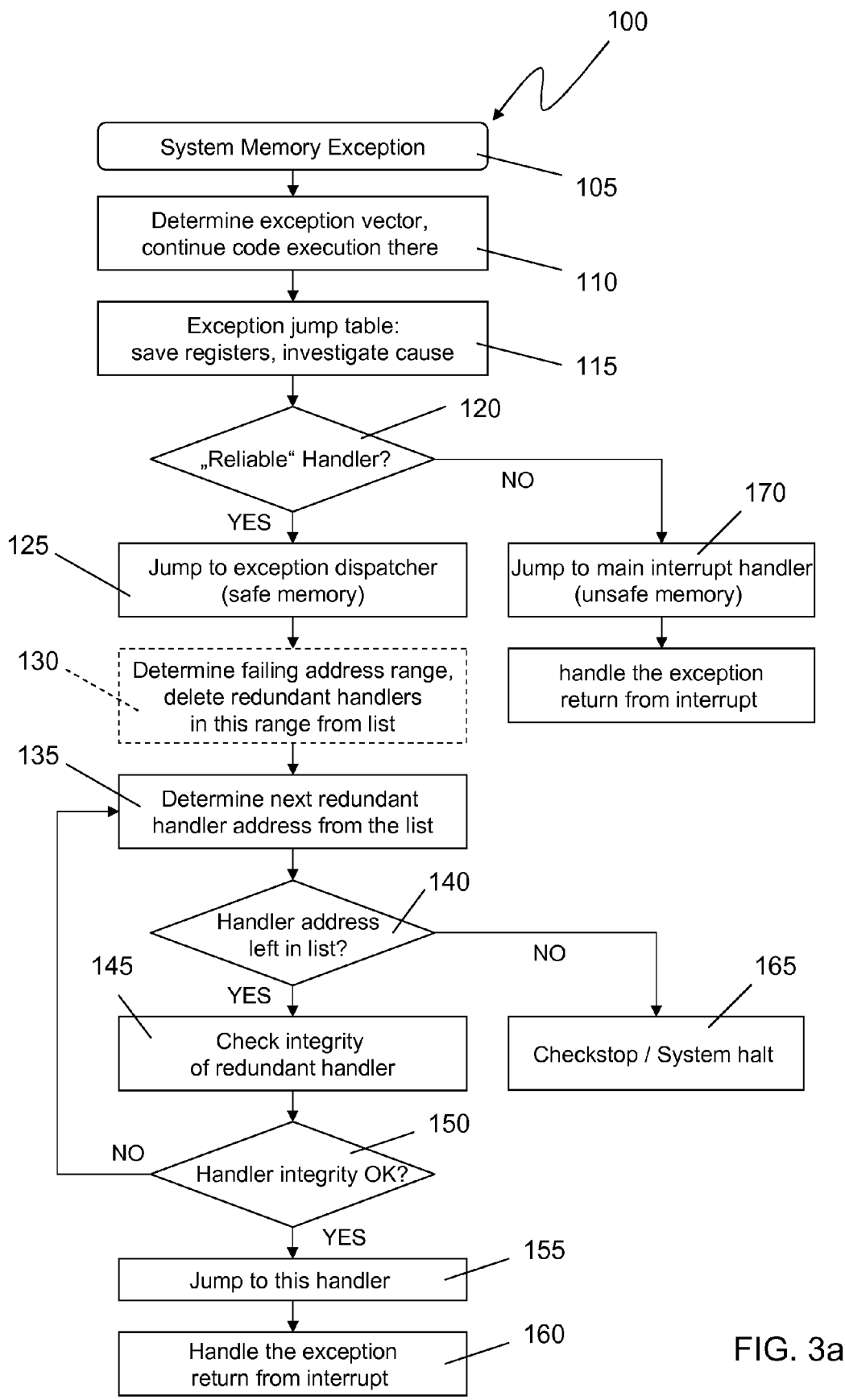
FIG. 3a is a flow diagram of an exception handling method according to the invention.
Figure 3B:
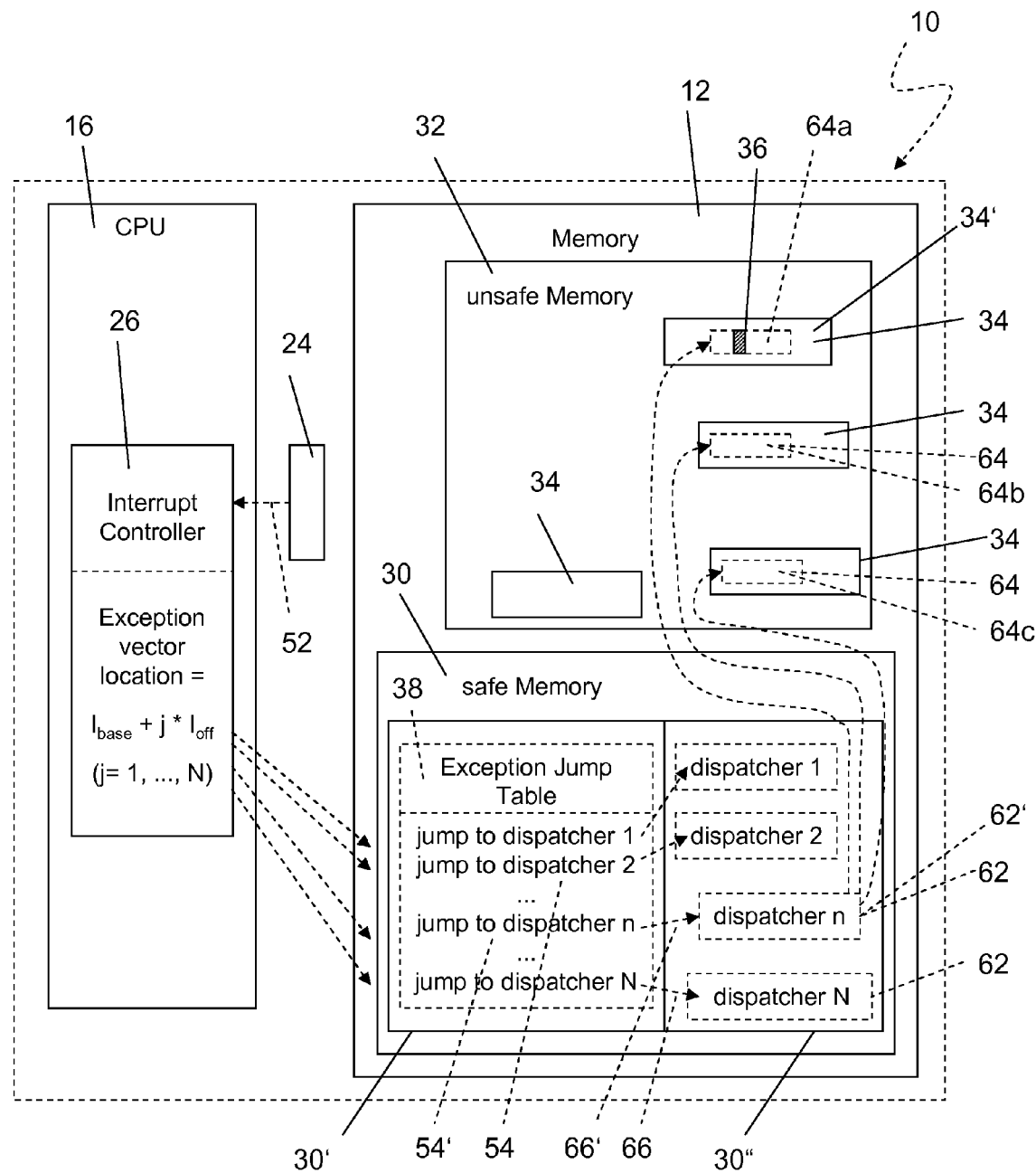

This deadlock can be avoided by implementing a reliable exception handling scheme according to the invention, a preferred embodiment of which will now be explained in conjunction with FIGS. 3a and 3b. FIG. 3a shows a schematic flow diagram of a preferred embodiment of a reliable exception handling method 100 according to the invention, whereas FIG. 3b depicts a computer system 10 embodiment of the invention, showing memory 12 and CPU 16 of this computer system 10 (analogous to the representation of FIG. 2b). Again, memory 12 of computer system 10 is seen to contain a safe memory region 30, such as SRAM or cache, as well as an unsafe memory region 32 with memory modules 34. Safe memory region 30 accommodates an exception jump table 38, where each entry of the exception jump table—corresponding to the various exception types—contains an exception vector 66, 66' pointing to an exception handler 60. However, in contrast to the standard exception handling scheme of FIG. 2, the exception handlers are not atomic, but each exception handler 60 comprises two constituents, namely, an exception dispatcher 62 residing in the safe memory region 30, a main exception handler 64, multiple instances 64a, 64b, 64c of which reside in the unsafe memory region 32.

Thus, in order to provide reliable exception handling in the event of a hardware failure, redundancy is built into the exception handling system by splitting the exception handler 60 into two distinct parts, the exception dispatcher 62 and the main exception handler 64. While the dispatcher 62 is unique and resides in safe memory space 30, there exist several redundant copies 64a, 64b, 64c of the main exception handler 64, each of these copies 64a, 64b, 64c residing in unsafe memory space 32. The main exception handler instances 64a, 64b, 64c reside in general (unsafe) memory region 32 since, generally, safe memory space 30 is very limited, and thus the main exception handlers 64 are unlikely to fit into safe memory space 30 completely.

Referring to the flow diagram of FIG. 3a showing an embodiment of the reliable exception handling method 100 of the invention, an exception generally is triggered by the occurrence of a memory error occurring within computer system 10 (step 105). For example, assume that a memory error of exception type n occurs at memory address 36 on memory module 34' in unsafe memory region 32 of FIG. 3b. As this memory error is detected by the memory controller 24, the exception type as well as the failing memory address 36 is determined and the failure is signaled to the interrupt controller 26 (arrow 52 in FIG. 3a). This interrupt signal causes the computer system's CPU 16 to save part of the actual state of the CPU in certain registers, identify the cause of the interrupt in another register, and continue execution at an exception vector location corresponding to the specific exception (step 110). In the specific computer architecture of FIG. 3b, the exception vector is determined by adding a fixed offset Ioff to an interrupt vector base register Ibase, analogously to the method of FIG. 2a, and execution flow is directed to an entry 54 in exception jump table 38, said entry corresponding to the specific exception type of the hardware error encountered (step 115). The entries 54 of exception jump table 38 may also contain small pieces of code for saving more registers, investigating the cause of the interrupt, and performing vital interrupt enabling/disabling, etc.

In contrast to the standard exception handling scheme of FIGS. 2a and 2b, entry 54 of exception jump table 38 does not point to an exception handler 58 residing in unsafe memory region 32 but instead directs execution flow to an exception dispatcher 62 residing in a safe memory region 30 (step 125). This exception dispatcher 62 is a relatively small program containing the initial entry point for the exception vector 66, 66' and therefore has to be unique, which means that it cannot reside in multiple locations, but can only be located at one single address in the system's memory address map. The different dispatchers 62 shown in FIG. 3b correspond to different exception types 1, ..., N, where N represents the total number of dispatchers while n represents a specific dispatcher. Preferably (but not necessarily) the exception dispatcher 62 resides on a highly reliable and safe memory device which is not expected to fail (for example, on a static RAM (SRAM) chip which would hardly fail except in the case of a processor failure); in the embodiment of FIG. 3b, they are seen to reside in safe memory region 30.

The exception dispatcher 62 possesses sufficient intelligence to determine a memory address that will lead to a working copy 64b, 64c of the main exception handler 64, i.e., the actual exception handling program, residing on an intact memory module 34 in unsafe memory region 32.

The main exception handler 64 contains all software and tools necessary and/or available to perform debugging, dump acquisition and recovery, as well as software forensics and/or graceful system shutdown. Multiple instances 64a, 64b, 64c of the main exception handler 64 are stored in two or more memory modules 34 in unsafe memory region 32—typically in normal DRAM—so that the main exception handler 64 can be accessed at various different addresses in the physical address map of the computer system 10. Each instance 64a, 64b, 64c of the main exception handler 64 contains a small header identifying the code block's purpose and its length, thus enabling the system to ensure the integrity of this specific instance 64a, 64b, 64c of the main exception handler 64 to the exception dispatcher 62 and, as such, verify the dispatcher's 62 decision to pick this specific instance of the main exception handler 64. Since there exist multiple instances 64a, 64b, 64c of the actual exception handling code stored in different memory modules 34, 34', the probability of a memory module 34 failure compromising the whole computer system 10 is strongly reduced.

A list of addresses of all instances 64a, 64b, 64c of the main exception handler 64 is stored in dispatcher 62 pertaining to the corresponding exception type j. As program execution flow is directed from the exception jump table 38 to the dispatcher 62 (step 125), the list residing in the dispatcher 62 is consulted (step 135), and a specific entry (e.g. the entry at the top of this list) such as main exception handler instance 64a is checked for data integrity (step 145). This integrity check may, for example, be conducted by computing checksums or by some other algorithm. In the example of FIG. 3b, this integrity check will fail, since main exception handler instance 64a is stored in a region of memory module 34' which exhibits an (uncorrectable) error. In this case, the list of exception handler instances is examined for alternative instances (step 135). In the example of FIG. 3b, the list will contain addresses of alternative exception handler instances 64b and 64c, so that the next item of the list (instance 64b) can be checked for data integrity (step 145). If this verification step is successful (step 150), execution control is transferred to instance 64b of the main exception handler (step 155), the main exception handler is executed, and control is returned from the interrupt (step 160). If the verification step is not successful (step 150), the list of addresses of main exception handler instances will be iterated until there are no more entries (step 140). If no intact instance of the main exception handler can be found, the computer system 10 is halted (step 165).

Before iterating the list of addresses of all instances 64a, 64b, 64c of the main exception handler 64 (step 135), a scanning step 130 may be optionally be performed. In this step 130, the address range 16 of the memory error is determined, and all main exception handler instances 64a residing in this address range 16 are removed from the list.

The exception handling scheme of FIGS. 3a and 3b is particularly advantageous in the case of exception handlers which are not re-entrant, i.e. which cannot be called again or interrupted while they are running: If an exception handler of this kind runs into a memory error, the consequences would be fatal, since code execution would continue indefinitely in the corrupted address region 16 of the exception handler and never return.—Since the exception handling scheme of the invention provides multiple copies of the exception handler, instances residing in corrupted memory regions can be avoided—and the method 100 of FIG. 3a, by verifying exception handler integrity (step 145) before execution, ensures that only intact exception handler instances will executed.

As explained in conjunction with FIGS. 3a and 3b, multiple exception handler instances 64a, 64b, 64c stored in different modules ensure reliable exception handling without running into a memory error. In general, there may be a mix of "reliable" exception handlers (encompassing multiple copies stored in unsafe memory region 32) as well as "unreliable" exception handlers (with only one copy stored in unsafe memory region 32). In this case the exception vector 66 may point to a dispatcher in safe memory 30 which branches to the unique copy of the "unreliable" main exception handler in unsafe memory 32 (step 170). While the dispatcher 62 for memory errors is mandatory, each "reliable" exception handler 64 requires its own dispatcher 62 and redundant main handler instances 64a, 64b, 64c.

When mixing "reliable" and "unreliable" exception handling, an area 30' within safe memory region 30 (so-called first safe memory area 30') should be pre-defined as storage space for the exception jump table 38 if the CPU 16 implements fixed exception vector offsets Ioff. Additionally, an area 30" (so-called second safe memory area 30") within safe memory region 30 should be pre-defined for storing the exception dispatchers 62. This area 30" has to be large enough to store the set of exception dispatchers 62 for all exception types j=1, ..., N.

In the embodiment of FIG. 3b, the exception dispatcher 62 is stored in an area 30" within safe memory region 30 which is directly accessible within the CPU 16 address range but represents external memory to the CPU 16. Alternatively, the exception dispatcher 62 may be stored in CPU 16 internal memory. More generally, the exception dispatcher 62 may reside in any area 30" of memory 12 that is directly and reliably accessible to the CPU 16 and can be the target of a change in control flow as it occurs during a system exception. In many implementations the CPU 16 cache can be used for this purpose, by pinning cache lines to keep the code located in the cache: Many modern Level2 cache implementations prevent cache lines for configurable addresses from being re-used for another address, and thus the contents of the corresponding cache partitions cannot be overwritten but will always be present in the cache. If an exception redirects the instruction pointer to its corresponding exception vector, then the dispatcher stored in cache will always succeed in directing the execution flow to an intact copy of the main exception handler and never direct the flow to a possibly faulty memory module.

Figure 3C:
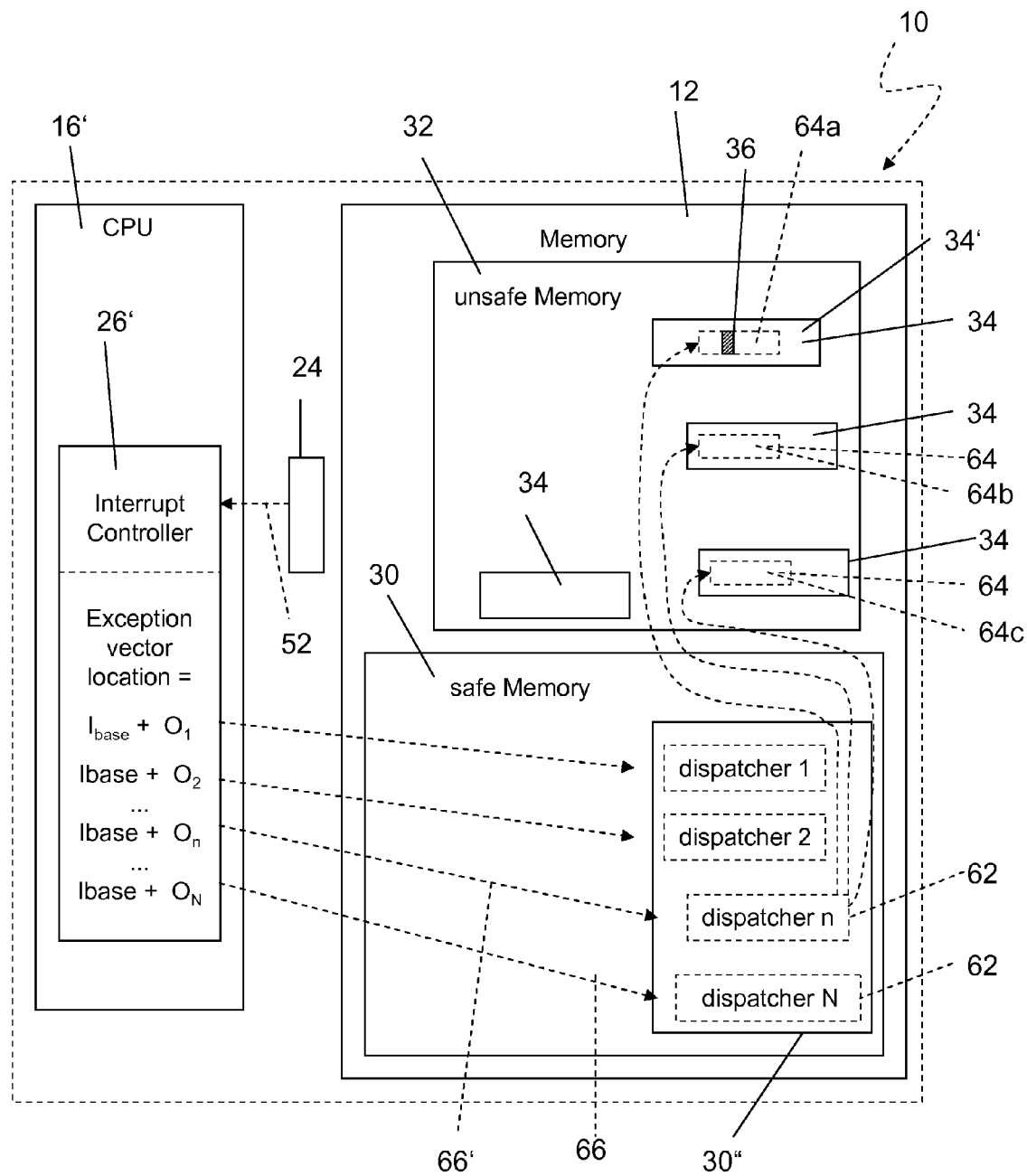
Figure 4:
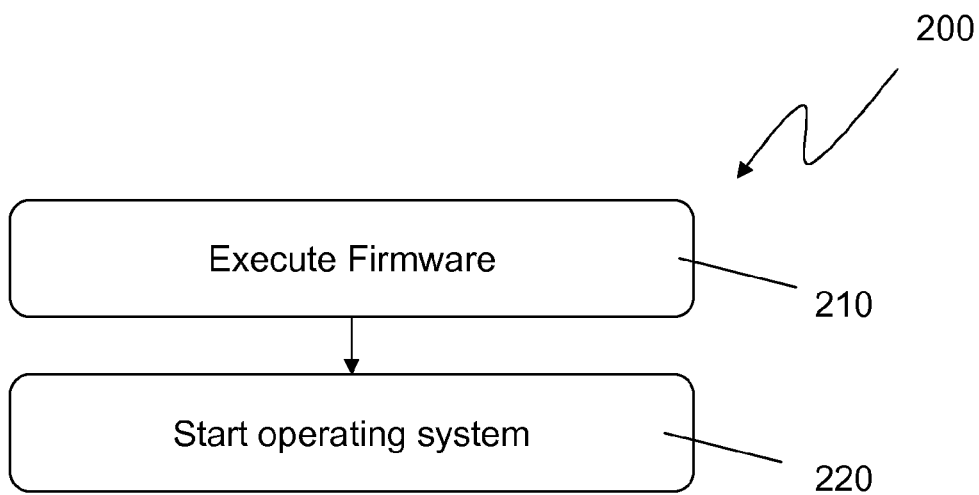
FIG. 4 is a flow diagram of a computer startup method.
Figure 5A:
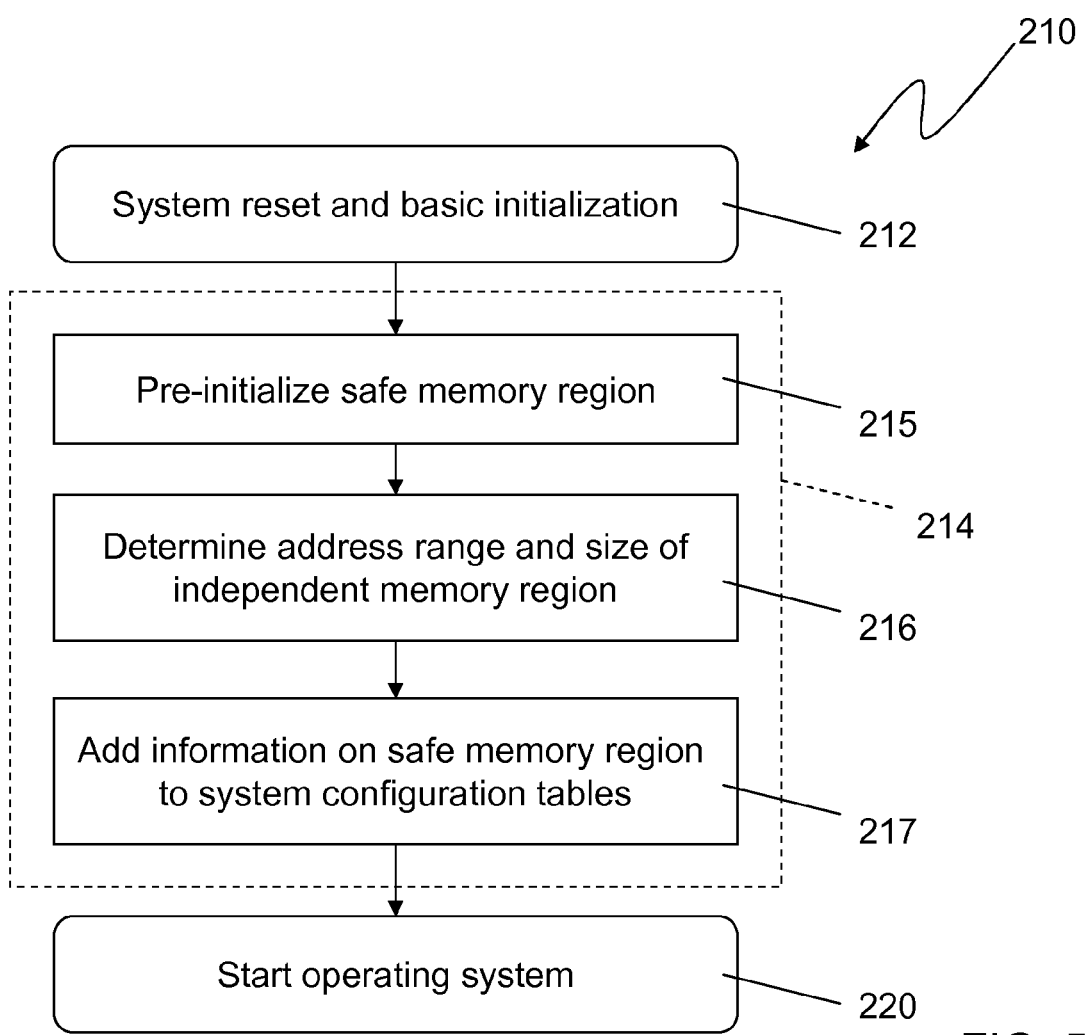
FIG. 5a is a flow diagram of a preferred embodiment of a firmware initialization step of FIG. 4, comprising pre-initialization of memory regions for exception handling.
Figure 5B:
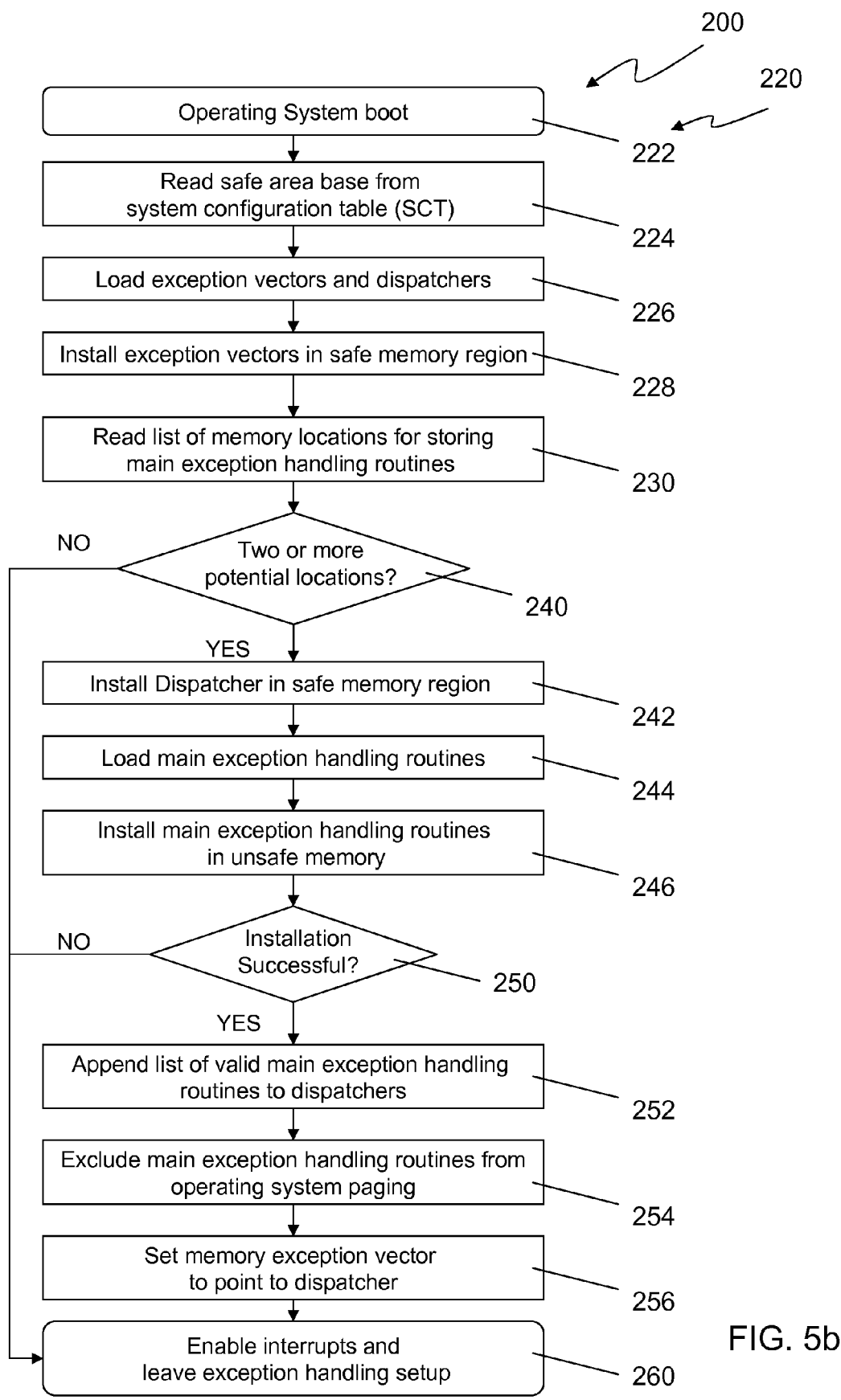
FIG. 5b is a flow diagram of a preferred embodiment of an operating system initialization step of FIG. 4, comprising memory storage of exception handling code.

In order to be able to execute the reliable exception handling scheme of FIGS. 3a, 3b and 3c, the required data and code have to be loaded into the appropriate locations in computer system memory 12. This is preferably carried out during the computer system 10 startup. FIG. 4 shows a schematic flow diagram of a preferred embodiment of a computer system 10 startup method 200 according to the invention. The startup method 200 comprises a firmware execution step 210 (shown in more detail in FIG. 5a) and an operating (OS) system boot step 220 (FIG. 5b). In what follows, the term operating system (OS) will be used to describe either a classical operating system or a system hypervisor as the software instance that controls the exception handing processes. Also, only initialization steps pertaining to exception handling will be considered.

As the computer system 10 is switched on, the system firmware starts executing. As part of firmware execution (step 210), the basic hardware of the computer system 10 is reset (step 212) and a pre-initialization and configuration of the hardware takes place (step 214). After the firmware execution (step 210), the operating system is booted from one of the devices accessible to the computer system 10, for example from database 22, during boot step 220.

As part of the hardware pre-initializing and configuration step 214, hardware required for reliable exception handling (FIG. 3b) is allocated, and information on this hardware is gathered. In particular, a portion of memory space 12 is reserved and prepared as safe memory region 30 for storing the exception dispatchers 62 (step 215). If the computer system 10 comprises dedicated memory space (such as SRAM) which is to be used for the safe memory region 30, this memory space is pre-initialized so as to make it accessible for later use. Alternatively, if some area of cache is to be used for the safe memory region 30, the cache lines to be used are determined and locked so that they cannot be flushed out of cache. The address and the size of the safe memory region 30 are determined, and the exception vector base register is set to this address. Subsequently, the address and size information pertaining to the safe memory region 30 is added to a system configuration table (SCT) (step 217) from where this information will later be passed on to the operating system. In embodiments which are based on basic input/output system (BIOS) or Unified Extensible Firmware Interface (UEFI)/EFI firmware standards, the SCT corresponds to the so-called ACPI table. In embodiments which are based on the Open Firmware IEEE (Institute of Electrical and Electronics Engineers) 1275 standard, the SCT corresponds to the so-called device tree. Depending on the specific hardware embodiment, other system configuration tables are possible.

Also, physically independent regions of main memory (RAM) 32 are determined (step 216). The term "physically independent" means that if there is a defect in one specific region of the memory, this defect does not automatically affect other regions of the memory. Regions which are mutually physically independent may correspond to regions located on different memory modules 34 (such as DIMMs) or different independent channels on the memory controller 24 of the computer system 10. In step 217, information (such as start addresses and sizes) of these independent memory regions is added to the SCT as well.

Once the basic system initialization has been carried out by executing the computer system's firmware during a boot cycle (step 210), the operating system (OS) is started from one of the available boot devices (step 220). The operating system is responsible for bringing the computer system to its full functionality. In particular, the operating system is responsible for all exception handling. Therefore, during operating system startup (step 220) the hardware interrupt facilities have to be instrumented in such a way as to suit the operating system's needs; in particular, the SCT containing information on the safe memory region 30 and the physically independent regions of main memory 32, as gathered during the firmware execution step 210, is passed on to the operating system kernel of the computer system 10 (step 224).

The most fundamental initialization task of the operating system with regard to exception handling is to supply very small portions of code that resides within the safe memory area 30 and directs execution flow from the exception handling base at the corresponding exception vectors 66. The code typically comprises no more than a few bytes of code. Since the exception dispatcher 62 for a given exception type cannot be guaranteed to fit into the few bytes of space available for this initial handling, this small space (first safe memory area 30') is used for the entries of the exception jump table 38, which switch execution flow to the exception dispatcher 62 residing in a safe memory region outside of the exception vectors, namely in the second safe memory area 30". The dispatchers 62 then redirect system control to the memory location in which instances of the main exception handler 64 are stored.

FIG. 5b shows a flow diagram of selected steps of the operating system boot process 220 related to exception handling setup. Based on the firmware initialization as shown in FIG. 5a, the location of the safe area base (corresponding to the system exception handling base) is read from the system configuration table (SCT) (step 224) where this information was stored during firmware initialization step 217.

The operating system contains code relating to the exception vectors and the exception dispatchers within its file system (or ramdisk), both of which are loaded in step 226. The code corresponding to exception vectors is installed into the first safe memory area 30' in step 228. Subsequently, the list of physical contiguous address ranges which are suitable locations for storing the main exception handling routines are read from the system configuration table SCT in step 230. In order to provide reliable exception handling as described above, at least two entries (corresponding to storage of at least two instances of the main exception handler) are required to be in this list. If this is not the case (step 240), the standard (non-redundant) exception handling is enabled and the exception handling setup is terminated (step 260). Note that the exception handling routines which are put into place in this case provide basic exception features, but not the enhanced reliability of redundant exception handling as described above.

If the list of potential suitable storage locations available for main exception handling routines contains two or more entries, the corresponding dispatchers are installed in the second safe memory area 30" (step 242). The second safe memory area 30" generally resides directly adjacent to the first safe memory area 30' to which the exception vectors are copied, but may also reside at another physical address.

The operating system also contains the main exception handling routines within its file system or ramdisk. These are loaded and installed into locations in the generic (unsafe) memory region 32 as specified in the list contained in system configuration table (steps 244, 246). If the number of main exception handling routines which are successfully installed is less than two (step 250), the standard (non-redundant) exception handling is enabled and the exception handling setup is terminated (step 260). Note that the exception handling routines which are put into place in this case provide basic exception features, but not the enhanced reliability of redundant exception handling as described above.

If the installation was successful for more than two instances of the main exception handling routines, a list of the memory addresses of those main exception handling instances is appended to the dispatcher stored in the safe memory region 30 (step 252). The address map of the main exception handling instances is also provided to the memory management code in order to exclude the corresponding physical address ranges at which the main exception handling instances reside from paging (step 254). The set of the operating system's exception vectors contains at least one vector that corresponds to the interrupt that is generated by hardware in the event of an ECC memory error. This vector's jump target is updated with the location of the dispatcher (step 256). Optionally, other exception vectors may be updated in this way to be routed to a dedicated dispatcher. This may be applicable if the operating system provides code with recovery features for handling certain memory exceptions, thus enabling execution continuation even after such a failure has occurred. Other exceptions of different types that might occur after such a reliably handled memory exception can in turn be reliably handled on their own behalf by not jumping into code that resides in defective memory (given that the implementation of the dispatcher supports this kind of feature).

Finally, exception handling is enabled and the exception handling setup is terminated (step 260). The exception handling procedure thus installed provides reliable exception handling by executing from dispatchers stored in a safe memory region 30 and using redundant instances of main exception handling code stored in generic (unsafe) memory region 32. This exception handling scheme may be used for memory related system exceptions (e.g. exceptions caused by failing memory modules) as well as other system exceptions (e.g. caused by the failure of other hardware components during computer runtime).

The embodiment of FIG. 3b and the installation method described in conjunction with FIG. 5b relate to an interrupt controller 26 implementation in which the exception vector location is determined by adding a fixed offset Ioff to an interrupt vector base register Ibase. Some processor architectures provide individual offset registers O1, . . . ON for each interrupt j=1, . . . , N, so that they do not require an exception jump table 38. An embodiment corresponding to this type of processor architecture is shown in FIG. 3c. The offset On which is added to the interrupt base Ibase is configurable for each individual interrupt type n. Therefore, the exception vectors 66, 66' can be implemented immediately within the interrupt controller 26', and process control is handed from the interrupt controller 26' directly to the dispatchers 62. Therefore, first safe memory area 30' is not needed any more, it suffices to allocate second safe memory area 30" for storing the dispatchers. Note that while the details of the steps necessary for accessing the dispatchers 62 depends on the processor architecture of the computer system 10 considered, the actual exception handling scheme (i.e. a unique dispatcher 62 stored in safe memory region 30 and multiple instances of the main exception handler 64 stored in unsafe memory region 32) remains unchanged.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer readable medium providing program code for use by or in connection with a computer or any instruction execution system. For the purposes of this description, a computer-usable or computer readable medium can be any apparatus that can contain, store, communicate, propagate, or transport the program for use by on in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read-only memory (CD-ROM), compact disk-read/write (CD-R/W) and DVD.

The invention claimed is:

1. A method of handling an exception caused by a hardware error in a computer system, the method comprising:
    selecting, via an exception dispatcher residing in a safe memory region, a specific instance of a plurality of instances of a main exception handler, wherein the plurality of instances reside within memory of the computer system; and
    executing the selected specific instance of the main exception handler.

2. A method of handling an exception caused by a hardware error in a computer system, the method comprising:
    determining an exception vector pertaining to said hardware error;
    transferring execution flow control to a dispatcher pertaining to said exception vector;
    selecting, via the dispatcher, a specific instance of a plurality of instances of a main exception handler, wherein the plurality of instances reside within memory of the computer system; and
    executing the selected specific instance of the main exception handler.

3. The method according to claim 2, wherein the dispatcher is stored in a safe memory region of the computer system memory.

4. The method according to claim 2, wherein the plurality of instances of a main exception handler are stored in an unsafe memory region of the computer system memory.

5. The method according to claim 2, wherein the selecting of the specific instance comprises:
    verifying an integrity of one or more instances of the main exception handler;
    terminating verification once an intact instance has been found;
    selecting that intact instance as the specific instance; and
    switching process control to said intact instance of the main exception handler.

6. The method according to claim 5, further comprising:
    branding as non-selectable all defective instances of the main exception handler;
    wherein said selecting the specific instance and each subsequent selection of a specific instance selects only an instance that is not branded as non-selectable.

7. A method of initializing a computer system that supports an exception handling scheme in which at least one exception vector is associated with an exception dispatcher and multiple instances of a main exception handler, the method comprising:
    allocating memory space for both the exception dispatcher and for the multiple instances of the main exception handler during firmware execution; and
    installing the exception dispatcher and the multiple instances of the main exception handler into respective memory spaces during operating system startup, wherein said installing of the exception dispatcher and the multiple instances of the main exception handler enables the dispatcher to select a specific instance of the multiple instances of the main exception handler in response to the occurrence of a hardware error that is determine to relate to the exception vector.

8. The method according to claim 7, wherein the firmware execution comprises:
initializing the basic hardware of the computing system;
allocating a region of memory space as a safe memory region for storing the exception dispatcher; and
determining physically independent regions of unsafe memory to be used for storing the instances of the main exception handler.

9. The method according to claim 8, further comprising storing address and size information on the safe memory region and the unsafe memory region in a system configuration table (SCT).

10. The method according to claim 7, wherein the operating system startup comprises:
loading the dispatcher and main exception handler;
installing the dispatcher in a safe memory region;
installing the multiple instances of the main exception handler in an unsafe memory region;
storing memory address information of the instances of the main exception handler in the dispatcher; and
setting the exception vector to point to the dispatcher.

11. The method according to claim 10, wherein the dispatcher is stored in static random access memory (SRAM) within the computer system memory.

12. The method according to claim 10, wherein the dispatcher is stored in the computer system's cache.

13. The method according to claim 10, wherein the exception handler instances are stored in different memory modules within the unsafe memory region.

14. A computer system comprising memory containing computer code for exception handling which, when detecting an error in a hardware component of the computer system, the code enables the computer system to:
determine an exception vector pertaining to said error;
delegate process control to a dispatcher located at the exception vector within a first area of memory;
select, via the dispatcher, a specific instance of a plurality of instances of a main exception handler, wherein the plurality of instances reside at different areas of memory from the first area of memory; and
execute the specific instance selected from the plurality of instances of the main exception handler.

15. A program product comprising a non-transitory computer useable medium including a computer readable program, wherein the computer readable program when executed on a computer system that exhibits an error in a hardware component of the computer system, the computer readable program causes the computer system to:
determine an exception vector pertaining to said error;
delegate process control to a dispatcher located at the exception vector within a first area of memory;
select, via the dispatcher, a specific instance of a plurality of instances of a main exception handler, wherein the plurality of instances reside at different areas of memory from the first area of memory; and
execute the specific instance selected from the plurality of instances of the main exception handler.

16. The program product according to claim 15, wherein:
the first area of memory is a safe memory region and the dispatcher is stored in a safe memory region of the computer system memory; and
the different areas of memory are within an unsafe region of memory and the plurality of instances of a main exception handler are stored in an unsafe memory region of the computer system memory.

17. The program product according to claim 15, wherein to select the specific instance the computer readable program causes the computer system to:
verify an integrity of one or more instances of the main exception handler;
brand as non-selectable all defective instances of the main exception handler;
terminate verification once an intact instance has been found;
select that intact instance as the specific instance;
wherein said selecting the specific instance and each subsequent selection of a specific instance selects only an instance that is not branded as non-selectable; and
switch process control to said intact instance of the main exception handler.

18. The method of claim 1, further comprising:
allocating memory space for both the exception dispatcher and for the multiple instances of the main exception handler during firmware execution; and
installing the exception dispatcher and the multiple instances of the main exception handler into respective memory spaces during operating system startup, wherein said installing of the exception dispatcher and the multiple instances of the main exception handler enables the dispatcher to select a specific instance of the multiple instances of the main exception handler in response to the occurrence of a hardware error that is determine to relate to an exception vector that is associated with the exception dispatcher.

19. The method of claim 18, wherein the allocating memory space comprises:
allocating a region of memory space as a safe memory region for storing the exception dispatcher; and
determining physically independent regions of unsafe memory to be used for storing the instances of the main exception handler.

20. The method of claim 18, wherein the installing the exception dispatcher and the multiple instances of the main exception handler into respective memory spaces comprises:
loading the dispatcher and main exception handler;
installing the dispatcher in a safe memory region, wherein the dispatcher is stored in one of: static random access memory (SRAM) within the computer system memory; the computer system's cache;
installing the multiple instances of the main exception handler in an unsafe memory region, wherein the exception handler instances are stored in different memory modules within the unsafe memory region;
storing memory address information of the instances of the main exception handler in the dispatcher; and
setting the exception vector to point to the dispatcher.

* * * * *